(12) United States Patent
Oberndörfer

(10) Patent No.: US 9,404,562 B2
(45) Date of Patent: Aug. 2, 2016

(54) ELECTROMOTIVE LINEAR DRIVE

(75) Inventor: Andreas Oberndörfer, Bielefeld (DE)

(73) Assignee: DEWERTOKIN GMBH, Kirchlengern (DE)

( * ) Notice: Subject to any disclaimer, the term of this patent is extended or adjusted under 35 U.S.C. 154(b) by 271 days.

(21) Appl. No.: 14/113,130

(22) PCT Filed: Apr. 18, 2012

(86) PCT No.: PCT/EP2012/057059
§ 371 (c)(1),
(2), (4) Date: Jan. 27, 2014

(87) PCT Pub. No.: WO2012/143383
PCT Pub. Date: Oct. 26, 2012

(65) Prior Publication Data
US 2014/0202271 A1  Jul. 24, 2014

(30) Foreign Application Priority Data

Apr. 21, 2011 (DE) ...................... 20 2011 000 964 U

(51) Int. Cl.
| | | |
|---|---|---|
| *F16D 11/02* | (2006.01) | |
| *F16D 11/04* | (2006.01) | |
| *F16H 25/20* | (2006.01) | |
| *H02K 7/06* | (2006.01) | |
| *F16D 11/14* | (2006.01) | |
| *F16D 11/00* | (2006.01) | |

(52) U.S. Cl.
CPC ............ *F16H 25/2025* (2013.01); *F16D 11/14* (2013.01); *F16H 25/20* (2013.01); *H02K 7/06* (2013.01); *F16D 2011/002* (2013.01); *F16D 2011/006* (2013.01); *F16H 2025/2037* (2013.01); *F16H 2025/2071* (2013.01); *F16H 2025/2084* (2013.01); *Y10T 74/18688* (2015.01); *Y10T 74/18696* (2015.01)

(58) Field of Classification Search
CPC  F16H 25/2025; F16D 2011/002; F16D 11/14
USPC .................................. 74/89.37, 89.34, 89.31
See application file for complete search history.

(56) References Cited

U.S. PATENT DOCUMENTS 2,151,730 A * 3/1939 Basebe ................... F16C 33/78
                                                            277/369
5,918,505 A   7/1999 Jensen
(Continued)

FOREIGN PATENT DOCUMENTS

| DE | 199 50 689 A1 | 11/2000 |
|---|---|---|
| DE | 695 23 472 T2 | 7/2002 |
| DE | 20 2004 017 769 U1 | 4/2006 |
| DE | 10 2005 020 935 B4 | 2/2007 |
| DE | 20 2010 004 265 U1 | 9/2010 |

(Continued)

OTHER PUBLICATIONS

International Search Report issued by the European Patent Office in International Application PCT/EP2012/057059 on Apr. 15, 2013.

*Primary Examiner* — William Kelleher
*Assistant Examiner* — Randell J Krug
(74) *Attorney, Agent, or Firm* — Henry M. Feiereisen LLC

(57) ABSTRACT

An electromotive linear drive with a housing that is equipped with a drive unit, the output member of which is designed as linearly movable spindle nut that is operatively connected to a connecting part for connecting to another component. The spindle nut is engaged with the connecting part in the normal operating state by a first coupling part and a second coupling part engaged with said first coupling part, and the driving connection can be decoupled by a movement of at least one coupling part in the longitudinal direction of the spindle.

12 Claims, 6 Drawing Sheets

(56) References Cited

U.S. PATENT DOCUMENTS

| | | | |
|---|---|---|---|
| 2002/0104701 A1* | 8/2002 | Fukuda | B60K 11/08 180/224 |
| 2006/0107776 A1 | 5/2006 | Minnig et al. | |
| 2006/0144179 A1 | 7/2006 | Greilinger et al. | |
| 2009/0014272 A1 | 1/2009 | Tagami et al. | |
| 2011/0043062 A1* | 2/2011 | Lorenzen | A61G 7/10174 310/83 |

FOREIGN PATENT DOCUMENTS

| | | | |
|---|---|---|---|
| EP | 1 457 710 B1 | 9/2005 | |
| EP | 2 141 113 A1 | 1/2010 | |
| EP | 674 764 B1 | 6/2010 | |
| GB | 700 706 A | 12/1953 | |
| SE | EP 1457710 A1 * | 9/2004 | F16H 25/2454 |
| WO | WO 2009/097856 | 8/2009 | |

\* cited by examiner

ELECTROMOTIVE LINEAR DRIVE

CROSS-REFERENCES TO RELATED APPLICATIONS

This application is the U.S. National Stage of International Application No. PCT/EP2012/057059, filed Apr. 18, 2012, which designated the United States and has been published as International Publication No. WO 20121143383 and which claims the priority of Swiss Patent Application, Serial No. 202011000964.5, filed Apr. 21, 2011, pursuant to 35 U.S.C. 119(a)-(d).

BACKGROUND OF THE INVENTION

The invention relates to an electromotive linear drive, comprising a housing in which a drive unit is arranged, the output member of which is designed as a linearly movable spindle nut that is operatively connected to a connecting part for connection to a further component. The further component is preferably adjustable. The spindle nut can be rigidly connected to a lifting tube whose free end is coupled with the further component.

The electromotive linear drive in its preferred embodiment is a furniture drive for adjusting furniture components. Furthermore, the linear drive is a single drive in a preferred embodiment, i.e. a drive unit is arranged in the housing in order to adjust the lifting tube in the longitudinal direction which is to be coupled with a furniture component connected thereto.

All pieces of furniture in the domestic field and in the health care and hospital fields can be considered as pieces of furniture which are arranged for example as berths, beds, slatted frames, treatment couches, hospital nursing beds or, in the wider sense, patient lifts.

The drive unit consists of an electric motor that can be operated with a DC safety voltage, to which a speed-reduction gear such as a worm gear is connected. A spindle is driven by the speed-reduction gear, on which the spindle nut is placed which forms the output member. The spindle nut will move in operation in the direction towards the free end or in the direction towards the speed-reduction gear depending on the direction of rotation of the drive motor. The drive unit consists in this embodiment of the aforementioned components, but the lifting tube is a connecting part between the output member of the drive unit and the furniture components to be adjusted.

Electromotive linear drives of furniture drives are known in which the connected furniture component is adjusted electromotively in the normal operating state, i.e. when the furniture component to be adjusted is displaced by rotation of the spindle and by displacing the spindle nut, in which the spindle nut is held in a torque-proof manner by a fork head as the connecting part, wherein the fork head is placed on the end region of the lifting tube. Said fork head can be provided with a disconnecting clutch, so that spindle nut will rotate and will also still simultaneously be displaced in the longitudinal direction of the spindle when said disconnecting clutch is actuated.

If the speed-reduction gear is a worm drive, the axes of the drive motor and the spindle are disposed at a right angle with respect to each other. The flanged tube can be rigidly connected to the housing, i.e. it can be an integral formed part, but it can also be fixed to the housing by means of suitable fastening means. The lifting tube is guided in the flanged tube. The housing is usually made of two housing parts.

The components are made of plastic in the standard designs of the electromotive linear drive, with the exception the spindle, the worm and the drive motor which consists of steel.

Further components such as a switch can be installed in the flanged tube. The lifting tube usually has an annular cross-section.

The use of a disconnecting clutch is problematic for many purposes because the furniture component to be adjusted will be lowered suddenly during the disconnection of the clutch because the thread of the threaded spindle is not provided with a self-inhibiting thread. In order to prevent this is it is known to use a braking device that is complex in its configuration.

Furthermore, constructions with an interlocking coupling are known, wherein the actuation and handling thereof is very complicated and not user-friendly.

SUMMARY OF THE INVENTION

The invention is based on the object of providing a constructionally simple solution for separating the driving connection between the spindle nut and the connecting part, which furthermore is exceptionally easy to handle and prevents sudden lowering of a furniture component.

This object is achieved in such a way that the spindle nut is engaged with the connecting part in the normal operating state via a first coupling part and a second coupling part that is engaged with said first coupling part, and the driving connection can be decoupled by a displacement of at least one coupling part in the longitudinal direction of the spindle.

The two coupling parts in cooperation with the connecting part are arranged in such a way that a sudden lowering during a decoupling of the driving connection is prevented. This is achieved in such a way in that the inhibition of the thread is arranged in the self-inhibited region or in the transitional region to the non-self-inhibiting region, and that the coupling part which can be actuated manually for decoupling is arranged such that it can be manually held in a torsion-proof manner at least in the decoupled state, and is in a torsion-proof connection to the spindle nut at least in the decoupled state. The decoupling allows that at least the spindle nut and/or the connected lifting tube is manually twisted, so that the spindle nut can be moved in both directions, depending on the direction of rotation of the coupling part.

The driving connection between the spindle nut and the connecting part by the two coupling parts can be arranged in such a way that either the second coupling part is separated from the connecting part or the second coupling part from the first coupling part.

It is especially advantageous if the second coupling part is arranged as a sliding sleeve which is provided with an internal profile section which is in engagement with the profile sections of the first coupling part and the connecting part. The driving connection can then be released in the simplest possible way by displacement of the sliding sleeve when it is moved in the longitudinal direction of the spindle. Once the driving connection is released, the spindle nut can be manually twisted by the second part, so that the connected furniture component can be lifted or lowered as required. The second coupling part can be provided in one embodiment with profiled sections on its outer jacket surface for improved manual gripping capability.

It is then especially advantageous in this embodiment when the connecting part comprises a circumferential collar in the end region facing the lifting tube or the spindle nut, which circumferential collar comprises a toothing which consists of teeth and tooth gaps, into which the internal toothing of the sliding sleeve engages which is arranged as the second coupling part. Said toothing does not correspond to a standardized toothing, but is arranged especially for the respective application.

It is especially advantageous for the function in this embodiment when the first coupling part is arranged as a cylindrical profiled body, which consists on the circumferential side of radially open grooves or flutes extending in the longitudinal direction of the lifting tube, into which the profile sections of the sliding sleeve engage in a closing manner. It is then especially advantageous when the internal profiled section of the sliding sleeve consists of axial webs which are arranged at equal angular distances from each other. Since these axial webs engage in a closing fashion in the tooth gaps of the connecting part and into the grooves or flutes of the first coupling part, a play-free driving connection is correspondingly provided, which is arranged in such a way however that a displacement of the sliding sleeve is possible with the lowest possible expenditure of force.

In a preferred embodiment, the grooves and flutes of the profiled body and the profiled section of the connecting part are arranged in such a way that the second coupling part or the sliding sleeve can be displaced in the direction of the longitudinal axis of the spindle nut of the drive unit for decoupling and coupling.

The decoupling can be provided according to two different embodiments in such a way that according to a preferred embodiment for decoupling the second coupling part or the sliding sleeve is moved in the direction towards the spindle nut or in the direction towards the gear and the motor. This leads to the advantage that in its further development the second coupling part or the sliding sleeve remains such that they can permanently be gripped both manually and also in an uninterrupted torsion-proof connection to the spindle nut. According to another alternative embodiment, the second coupling part or the sliding sleeve is moved for decoupling away from the gear and from the motor.

As a result, the driving connection between the two coupling parts is maintained, so that the lifting tube can be rotated by the rotation of the second coupling part of the sliding sleeve.

In order to ensure that the axial position of the second coupling part or the sliding sleeve is precisely fixed in all operating states, it is provided that the connecting part and the first coupling part comprise stop surfaces for limiting the second coupling part, and that the sliding sleeve is provided on the inside with a limit stop, preferably a segmented stop, which rests on the respective stop surface in the respective operating state.

In order to facilitate the rotational movement of the lifting tube, it is provided that an axial bearing, preferably an axial deep-groove ball bearing, is arranged between the mutually facing surfaces of the first coupling part and the connecting part. The frictional force to be overcome is thus minimized. Since the sliding sleeve has a considerably larger diameter than the lifting tube, the force required for applying the necessary torque is respectively low. It is still further provided for optimal handling that the sliding sleeve has a profiled section on the circumferential side, which profiled section is formed by elevations and depressions which preferably extend in the longitudinal direction.

It is provided for additionally securing the connecting part that the first coupling part is secured to the connecting part by a screwed connection.

In order to secure the second coupling part or the sliding sleeve against inadvertent displacement, it is provided that it comprises or they comprise a negotiable latched connection in the region or in the respective end position. If the second coupling part or the sliding sleeve is displaced with increased exertion of force in the longitudinal direction of the spindle, the latched connection comes out of engagement and the second coupling part of the sliding sleeve moves from the engaged state to a disengaged state or vice versa. In a very simple arrangement of the latched connection, the second coupling part or the sliding sleeve comprises at least one spring tongue formed by axial cuts on the circumferential side, which axial cuts comprise a latch on the inside such that the spring tongue is tension-free in both end positions. For the purpose of displacement from the one position to the other position, an elevation or a stop needs to be overcome, so that the sliding force needs to be increased accordingly. The latch will then rest on one side of the elevation in the two end positions of the sliding sleeve.

In order to ensure the connection between the first coupling part and the energy storage unit without displacement of the parts, it is provided that the first coupling part is loaded by means of an energy storage unit, wherein its force acts in the direction towards the connecting part.

As a result, in this further embodiment the first coupling part and the connecting part are held together by a certain force of a few Newton by means of the energy storage unit which preferably comprises a coil spring in such a way that the toothings of the connecting part and the second coupling part are held in engagement in the normal operating position. This can be advantageous for example when the linear drive is operated in a load-free manner for test purposes for example. Notice must further be taken that the energy storage unit has a mechanical limitation or is provided with a mechanical limitation. It can be arranged as a kind of tie-bolt, wherein the first coupling part and the second coupling part move away from one another at first in the case of an exertion force exerted on the connecting part in the direction of the adjusting force, the energy storage unit is further tensioned as a result, and the tie-bolt limits the path of displacement between the connecting part and the first coupling part by a fixed limit stop. The tie-bolt is arranged in form of a screw with a fitted nut and therefore comprises a middle connecting part with enlargements in the respective end region. The path of displacement between the first coupling part and the connecting part is larger than the length of the toothing acting in the axial direction between the second coupling part and the connecting part.

The relevant advantage of this further embodiment is that the linear drive according to this embodiment can only produce adjusting forces in one direction of adjustment. As a result, the linear drive is only able to move the furniture component to be moved against shearing forces, e.g. in form of a reclining element of a bed or in form of a lifting arm of a patient lifter, whereas the energy storage unit will further be tensioned in the case of the occurrence of an adjusting force in the direction of gravity, the toothings will gradually move between the first coupling part and the connecting part until they come out of engagement and the torsion-proof connection between the second coupling part and sliding part will consequently separate, so that the torsion-proof connection between the spindle nut and the connecting part will also separate. A kind of pinch-protection system is advantageously formed in this manner, wherein the linear drive is unable to electromotively move the connected furniture component in form of a reclining element of a bed or in form of a lifting arm of a patient lifter in the direction of the shearing force.

In this previously mentioned arrangement with a pinch-protection function, the aforementioned preferred embodiment is provided for decoupling the second coupling part or the sliding sleeve in the direction towards the spindle nut or in the direction towards the gear and the motor. In the simplest of cases, the connecting part and at least the first and/or also the second coupling part will move away from one another under activation of the pinch-protection system when an adjusting force component acts in the effective direction of gravity of the furniture component is to be adjusted. Displacement limits are provided, wherein the second coupling part remains with the first coupling part, while the connecting part moves away therefrom. A separation of the rotating drive between the connecting part and the first and/or second coupling part is thus realized in the simplest possible way. Projections are used in various embodiments as displacement limits, which protrude radially to the inside on the second coupling part and are placed or integrally formed thereon. The first coupling part additionally comprises projections as an alternative or in another embodiment, which projections face radially to the outside and can also be placed or integrally formed thereon. The projections can be formed by screw heads or by surface portions of caulked or riveted sections and/or disks.

BRIEF DESCRIPTION OF THE DRAWING

The invention will be explained below in closer detail by reference to the enclosed drawings, wherein.

DETAILED DESCRIPTION OF THE PREFERRED EMBODIMENTS

Figure 1:
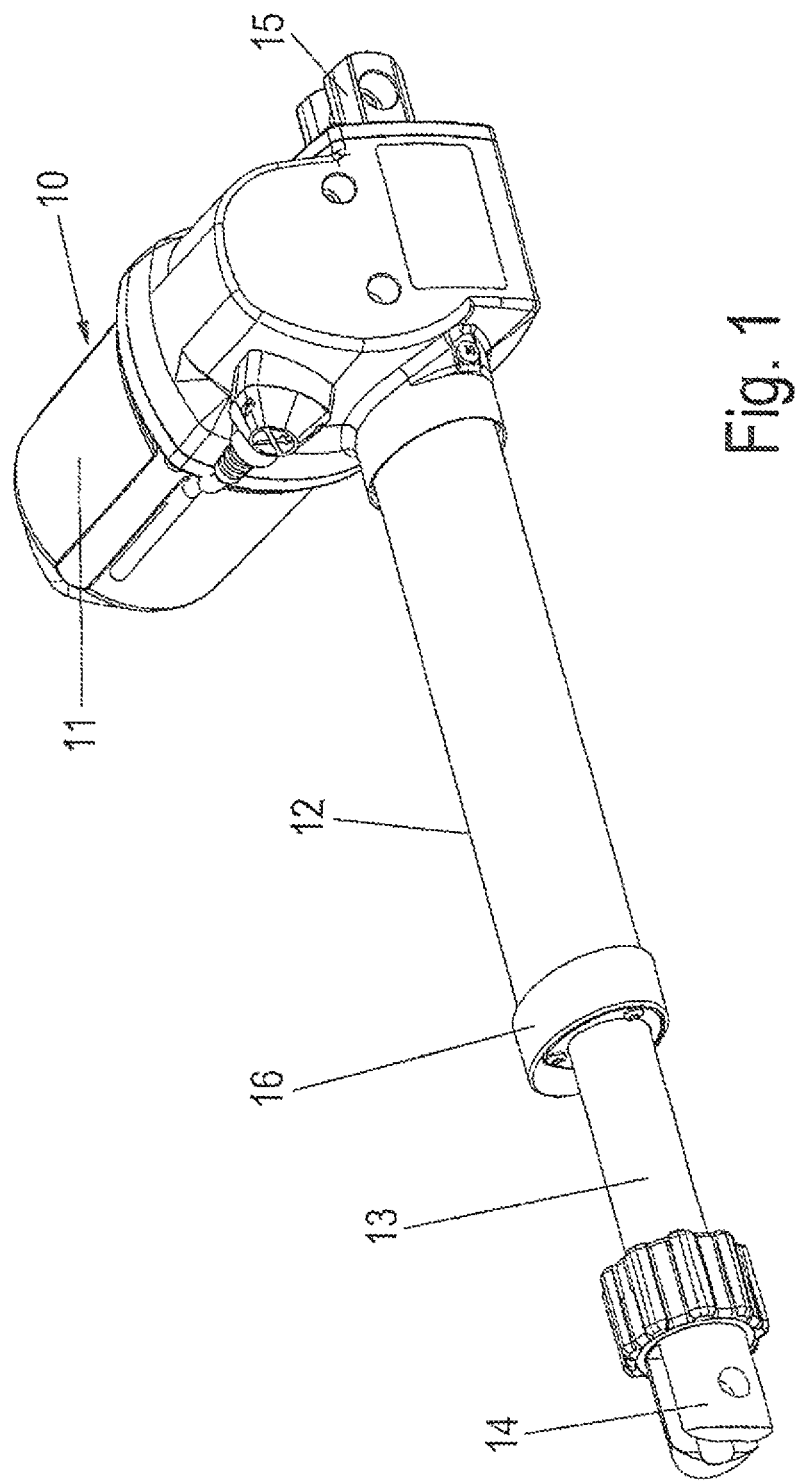
FIG. 1 shows an embodiment of an electromotive linear drive in form of a single drive in a perspective view.

The electromotive linear drive 10 as shown in FIG. 1 shall be considered an exemplary embodiment. The electromotive linear drive 10 contains a housing which is not explained in closer detail and which can consist of several parts and is made of plastic. The drive motor and the speed-reduction gear of the drive unit are preferably mounted in the housing 11. A spindle is coupled with the speed-reduction gear, which spindle extends in the direction of a flanged tube 12 arranged on the housing 11. A number of switches are arranged in said flanged tube 12 in a manner not explained in closer detail, which switches deactivate the motor in a controlling manner in at least one end region of the movement position of the connecting part 14. Furthermore, a distance measuring system in form of a linear potentiometer can be arranged in the flanged tube 12 in another embodiment not shown in closer detail, wherein the linear potentiometer comprises a wiper contact which is mechanically coupled with a spindle nut not shown in closer detail, or which is coupled with the connecting part 14 in a manner not shown in closer detail. The output member of the drive unit forms a spindle nut placed on the spindle, which spindle nut is rigidly connected to a retractable and extendable lifting tube 13 in the known manner according to this embodiment. A fork head 14 is placed on the free end as a connecting part for coupling the lifting tube 13 with a furniture component. In order to ensure that the electromotive linear drive 10 is pivotable during an adjusting process, a second connecting part, preferably in form of a fork head 15, is arranged on the opposite end on the housing 11. During an adjusting process, the first and the second connecting part are adjusted relative to one another, so that the connected furniture components are thus adjusted relative to one another. A generally known guide element 16 is placed on the free end of the flanged tube 12 which faces away from the housing 11.

The connection between the lifting tube 13 and the fork head 14 occurs by a first coupling part 17 and a second coupling part 18 which is displaceable in the longitudinal direction of the lifting tube 13.

Figure 4:
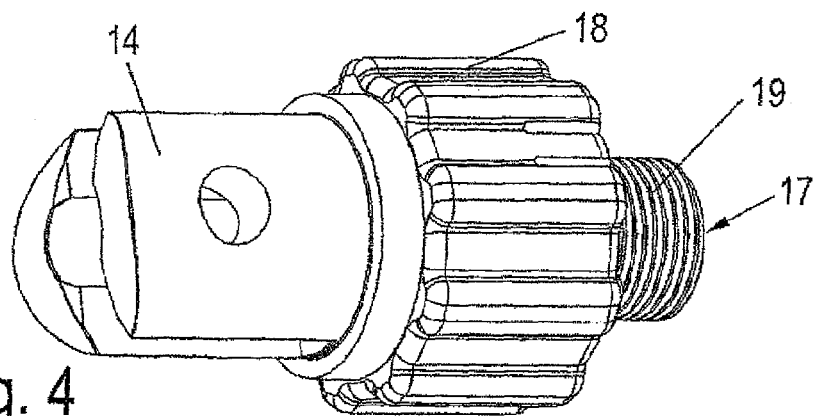
FIGS. 2 to 4 show the first and the second coupling part in conjunction with the connecting part in form of a fork head in perspective views in three different operating positions of the second coupling part.
Figure 3:
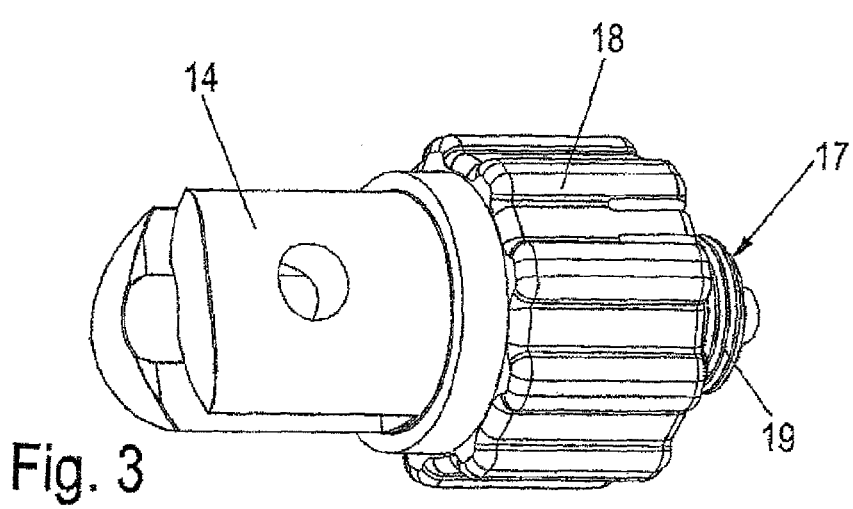
Figure 2:
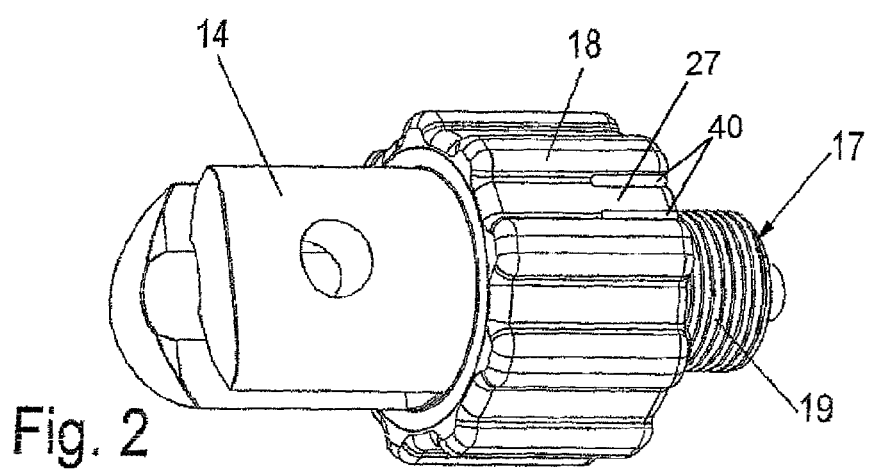
Figure 7:
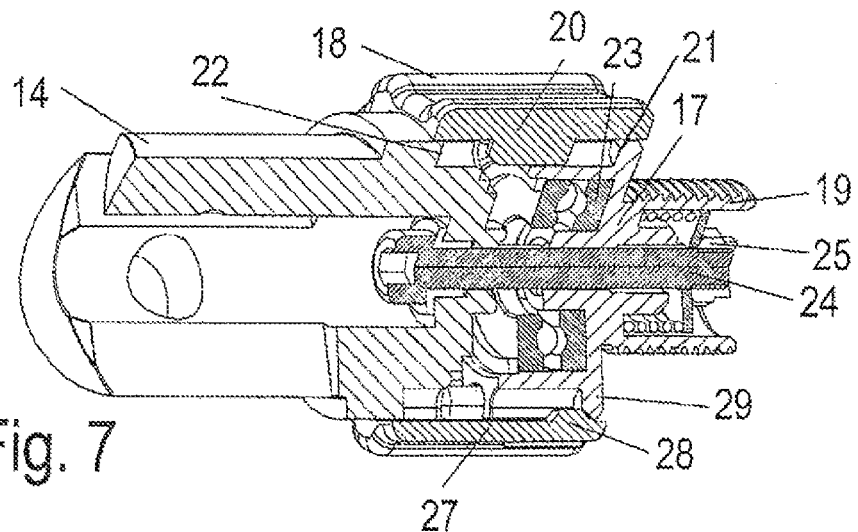
FIGS. 5 to 7 show sectional views corresponding to FIGS. 2 to 4.
Figure 6:
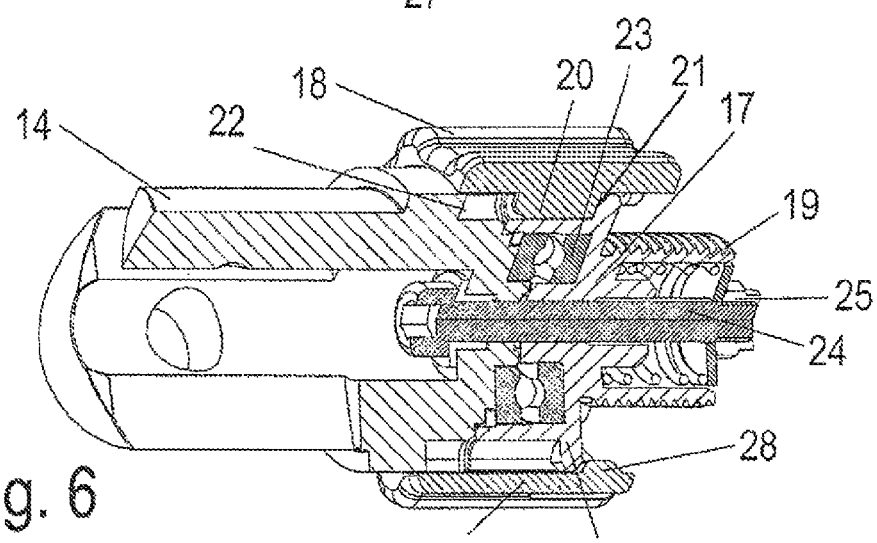
Figure 5:
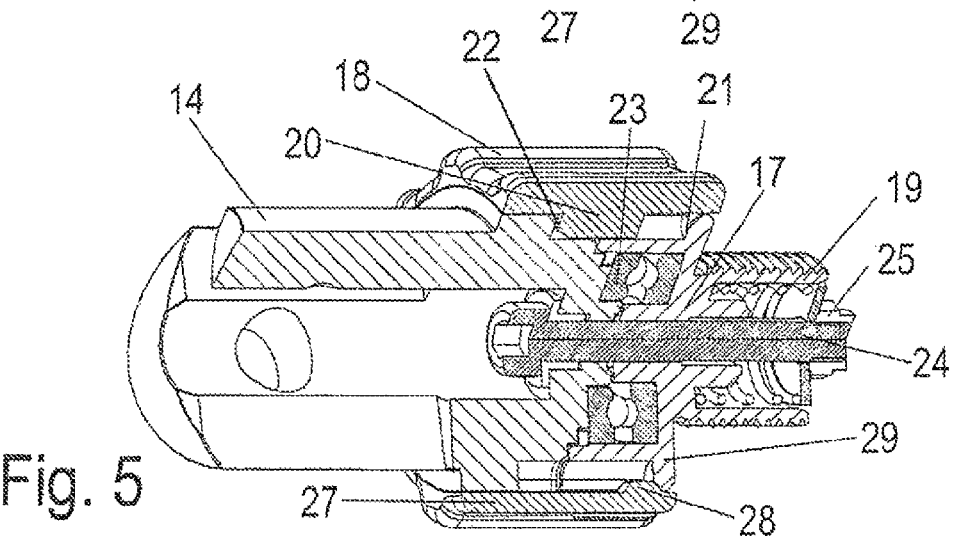

As is shown by a comparison of FIG. 2 with FIGS. 3 and 4 and by a comparison of FIG. 5 with FIGS. 6 and 7, the second coupling part 18 is arranged as a sliding sleeve whose circumferential surface is profiled. In the illustrated embodiment, this profiling consists of webs and grooves extending in the longitudinal direction of the lifting tube 13. As a result, the sliding sleeve can very easily be displaced and twist for rotating the lifting tube 13.

The first coupling part 17 comprises a cylindrical protrusion 19 on the side facing the drive unit, which protrusion is arranged to be rigidly connectable to the lifting tube 13 according to this embodiment and comprises a thread.

FIGS. 2 and 5 show the engaged position of the first coupling part 17 with the second coupling part 18, i.e. lifting tube 13, the spindle nut (not shown in closer detail) and the fork head 14 are in driving connection.

This driving connection is disengaged in FIGS. 3, 4, 6 and 7, so that the lifting tube 13 and the spindle nut are also twisted by rotation of the second coupling part 18. Both directions of rotation are possible. According to the illustrations, the linear drive 10 is arranged as a so-called pressure drive, wherein it produces a pressure force or a thrust force for adjusting the connected furniture components, which force acts against the force acting by the furniture component on the linear drive 10. In FIGS. 4 and 7, the first coupling part 17 and the fork head 14 arranged as the connecting part are disposed at a distance from each other, while the coil spring or pressure spring 13 which is arranged as an energy storage unit remains further tensioned and is shortened in its length. In accordance with FIGS. 4 and 7, this special operating state is assumed once an adjusting force is produced in the opposite direction, which corresponds to the direction of force which acts by the furniture component on the linear drive 10. The advantage of this special operating state is that the toothings of the first coupling part and/or the second coupling part 18 come out of engagement with the counter-toothing that is attached to or integrally formed on the connecting part and/or fork head 14. The torsion-proof connection between the connecting part or between the fork head 14 and the spindle nut is thus separated, so that the torsion-proof support of the spindle nut will be missing in further operation of the linear drive 10 and it will consequently rotate freely with the spindle. In the case of operation of the electromotive linear drive 10, it is at least unable to generate any tensile forces or any pressure forces in its kinematic reversion.

The second coupling part 18 is provided with a guide protrusion 20, wherein the movement is limited by stop surfaces 21, 22.

For the purpose of reducing friction during a rotation of the lifting tube 13, an axial deep-groove ball bearing 23 is placed on a protrusion of the first coupling part 17.

FIGS. 5 to 8 show that the connection between the fork head 14 and the first coupling part 17 is formed by a screw 24 and a nut 25 placed on the end of the shank, wherein the screw 24 and the nut 25 form a kind of tie-bolt.

As is shown in particular in FIGS. 5 to 7, the second coupling part 18 and the sliding sleeve are provided with two cuts 40 (FIG. 2) extending in parallel and at a distance from each other, so that a spring tongue 27 is formed. The spring tongue 27 is provided on the inside with a driving cam 28, which rests in the engaged position on a stop 29. In the disengaged position, the driving cam 28 rests on the other side of the stop 29, i.e. during the displacement of the second coupling part 18 the spring tongue 27 springs to the outside. The sliding sleeve 18 remains in the respective switching position during this process and latches into at least one of the end positions. The latching is cancelled again by increased manual exertion of force, so that the sliding sleeve can be pushed back again to the previous position.

Figure 8:
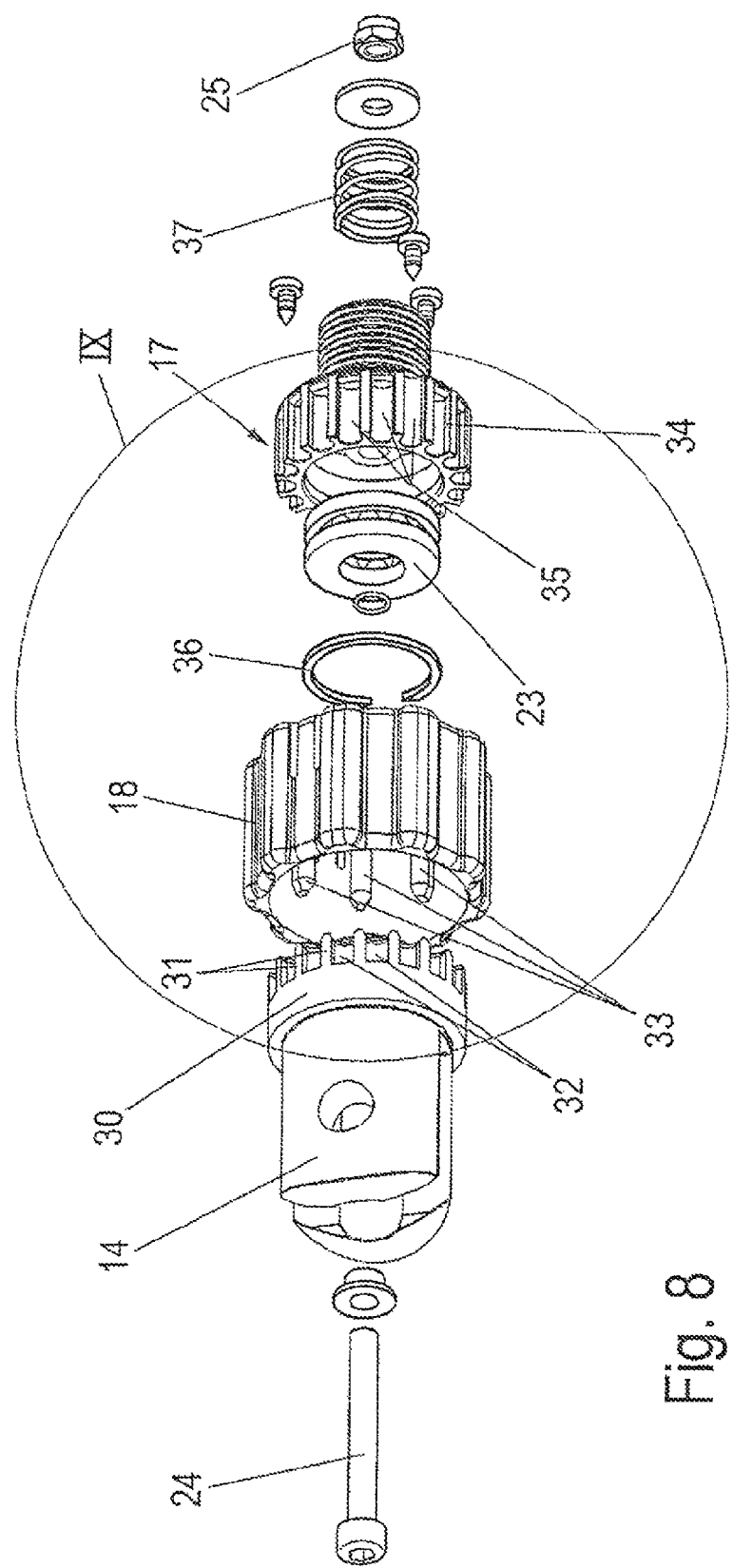
FIG. 8 shows the first and the second coupling part in conjunction with the fork head and various individual parts in an exploded view.
Figure 9:
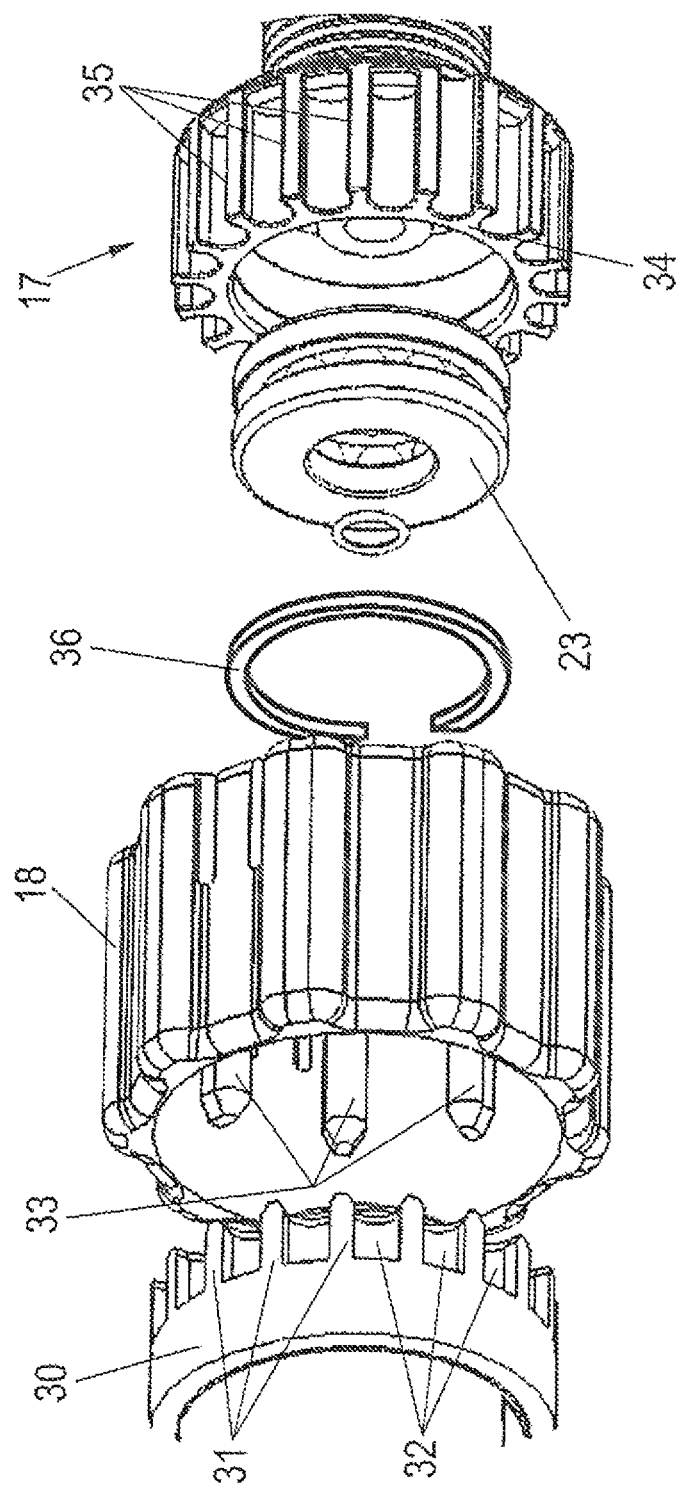
FIG. 9 shows a detail according to FIG. 8 in an enlarged view.

FIG. 8 shows that the connecting part 14, on the side facing the lifting tube 13, comprises a circumferential collar 30, which comprises a toothing on the side facing the lifting tube 13, which toothing is formed by teeth 31 and tooth gaps 32. The drawing further shows that the second coupling part 18 or the sliding sleeve is provided on the inside with axial webs 33, wherein the facing end regions engage into the tooth gaps 32 of collar in the driving position. This drawing shows that the connection between the connecting part 14 and the second coupling part 18 is interrupted when the second coupling part 18 is moved to the disengaged position as shown in FIGS. 6 and 7. The first coupling part is provided with a cylindrical profiled body 34 for guiding the second coupling part 18, which profiled body is provided in the longitudinal direction of the lifting to on the outside with grooves or flutes 35, into which the axial webs 33 of the second coupling part 18 continuously engage. Furthermore, the axial webs 33 are integrally formed on the second coupling part 18 according to the embodiment according to FIG. 8. They comprise angularly extending or boat-like tapering portions in the end region which faces the tooth gaps 32 in order to promote the engagement with the teeth 31.

According to other embodiments not shown in closer detail, the sliding sleeve 18 and the second coupling part 18 that comprises the axial webs 33 are arranged in several parts. It is further possible that the teeth 31 and the tooth gaps 32 are attached as a component to the connecting part 14.

FIG. 8 further shows that the axial securing of the axial deep-groove ball bearing 23 occurs by a retaining ring 36, and that the first coupling part 17 is loaded by a pressure spring 37, wherein the effective direction extends towards the connecting part 14.

It is further relevant that the toothings 34 of the first coupling part 17 and the toothing of the second coupling part 18 that is arranged as axial webs 33 are in permanent interlocking and torsion-proof connection to each other, while the toothing arranged as axial webs 33 with the tooth gaps 32 or while the gaps of the tooth gaps formed between the axle webs 33 can be brought manually into the teeth 31 into an engagement position or into a disengagement position depending on the position of the sliding sleeve or depending on the position of the second coupling part 18.

In accordance with the embodiment according to FIGS. 2 to 8, the first coupling part 17 and the second coupling part 18 are associated with the lifting tube 13 and/or the spindle nut and are connected in a torsion-proof manner to the spindle nut. The counter-toothing formed by the teeth 31 and tooth gaps 32 is associated with the connecting part 14, at least connected thereto in a torsion-proof manner, or arranged according to the embodiments according to FIGS. 2 to 8 as an integral formed part.

In kinematic reversion it is also possible that in another embodiment not shown in closer detail the first coupling part 17 and the second coupling part 18 is associated with the connecting part 14, rigidly attached thereto or forms an integral formed part with the connecting part 14.

For the purpose of easy mounting capability, all toothings are arranged as open toothings, wherein they extend in the longitudinal direction of the spindle and the lifting tube 13, but also in the radial direction on the circumferential side. All toothings are arranged in the manner of a jaw clutch. According to a further embodiment of the toothings not shown in closer detail, at least one toothing partner or its counter-toothing comprises boreholes or formed pockets, into which the other toothing partner or a counter-toothing will enter with teeth at least in sections.

Figure 10:
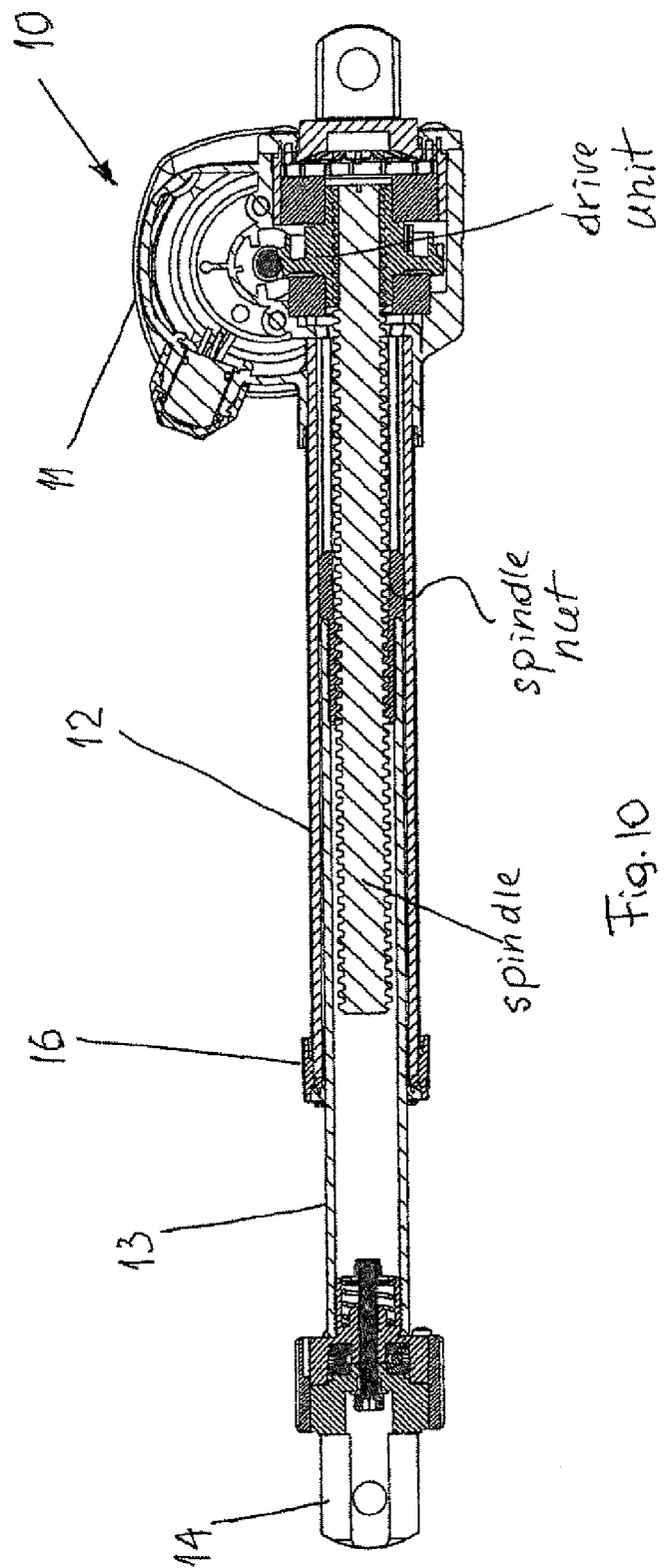
FIG. 10 shows a cross section of the electromotive drive.

FIG. 10 shows a cross section of the electromotive drive according to the present invention with the drive unit, the spindle, and the spindle nut.

The invention is not limited to the illustrated embodiment. It is relevant that the connection between the lifting tube 13 and the connecting part 14 occurs by a first coupling part 17 and a second displaceable coupling part 18, wherein the driving connection between the second coupling part 18 and the connecting part 14 will be released when the second coupling part 18 in form of a sliding sleeve is moved in the direction towards the lifting tube 13, so that the rotation of the lifting tube 13 occurs by rotation of the second coupling part 18.

The invention claimed is:

1. An electromotive linear drive, comprising:
a housing,
a drive unit arranged in the housing and having output member configured as a linearly movable spindle nut which is operatively connected to a connecting part for connection to another component, the spindle nut being engaged with the connecting part in a normal operating state via a first coupling part and a second coupling part that is engaged with the first coupling part, and is disengageable from it by a displacement of at least one of the coupling parts in a longitudinal direction of a spindle, wherein the second coupling part is constructed as a sliding sleeve provided with an internal profile section, which is in engagement in the normal operating state with profile sections of the first coupling part and with profile sections of the connecting part, wherein a toothing of the first coupling part and a toothing of the second coupling part which is formed as axial webs are in permanent interlocking and torsion-proof connection to each other, while the toothing formed as the axial webs or gaps of tooth spaces between the axial webs are bringable into an engagement position or into a disengagement position with the tooth gaps or teeth of the connecting part depending on the position of the second coupling part constructed as the driving sliding sleeve,
said second coupling part having at least one spring tongue which is formed by axial cuts on a circumferential side and provided with a driving cam, said second coupling part being axially displaceable relative to the first coupling part between one switching position in which the driving cam of the second coupling part rests on one side of a limit stop of the first coupling part and another switching position in which the driving cam of the second coupling part rests on another side of the limit stop of the first coupling part, wherein during the axial displacement of the second coupling part relative to the first coupling part from the one switching position to the other switching position and vice versa, the spring tongue of the second coupling part deflects outwardly to allow the driving cam of the second coupling part to move past the limit stop of the first coupling part.

2. The electromotive linear drive according to claim 1, wherein the connecting part has a circumferential collar in an end region facing a lifting tube or the spindle nut, and the circumferential collar has a toothing which includes the teeth and tooth gaps, into which an internal toothing of the sliding sleeve engages.

3. An electromotive linear drive according claim 2, wherein the first coupling part is constructed as a cylindrical profiled body, which on a circumferential side has outwardly open grooves or flutes extending in a longitudinal direction of the lifting tube, into which axial webs of the first coupling part or the sliding sleeve engage in a closing manner.

4. The electromotive linear drive according to claim 3, wherein the internal profiled section of the first coupling part or the sliding sleeve has axial webs which are arranged at equal angular distances from each other.

5. The electromotive linear drive claim 1, wherein the connecting part and the first coupling part have stop surfaces for limiting a sliding movement of the first coupling part or the sliding sleeve, and the first coupling part is provided on an inside with a guide protrusion.

6. The electromotive linear drive according to claim 1, further comprising an axial bearing arranged between the first coupling part and the connecting part.

7. The electromotive linear drive according to claim 6, wherein the axial bearing is an axial deep-groove ball bearing.

8. The electromotive linear drive according to claim 1, wherein the first coupling part is coupled with the connecting part by a screwed connection.

9. The electromotive linear drive according to claim 1, further comprising an energy storage unit which loads the first coupling part and has a force acting in a direction towards the connecting part.

10. The electromotive linear drive according to claim 1, wherein the second coupling part has a profiled section on an outside.

11. The electromotive linear drive according to claim 1, wherein the sliding sleeves and the second coupling part have the axial webs arranged in several parts.

12. The electromotive linear drive according to claim 2, wherein the teeth and the tooth gaps are attached as a component to the connecting part.

* * * * *